United States Patent [19]

Popovich et al.

[11] 4,337,759
[45] Jul. 6, 1982

[54] RADIANT ENERGY CONCENTRATION BY OPTICAL TOTAL INTERNAL REFLECTION

[75] Inventors: John M. Popovich, 2640 Hermosa Ave. #3, Hermosa Beach, Calif. 90254; William A. Parkyn, Jr., 40210 92d St., Leona Valley, Calif. 93550; David G. Pelka, 8315 Kenyon Ave., Los Angeles, Calif. 90045

[73] Assignees: John M. Popovich, Hermosa Beach; William A. Parkyn, Jr., Leona Valley; David G. Pelka, Los Angeles, all of Calif.

[21] Appl. No.: 238,859

[22] Filed: Feb. 27, 1981

Related U.S. Application Data

[63] Continuation of Ser. No. 83,467, Oct. 10, 1979, abandoned.

[51] Int. Cl.³ .............................................. F24J 3/02
[52] U.S. Cl. .................................. 126/438; 126/440; 350/299
[58] Field of Search ............. 126/440, 438, 439, 450, 126/441, 417; 350/299, 288, 409

[56] References Cited

U.S. PATENT DOCUMENTS

| 1,421,506 | 7/1922 | Limpert | 126/438 |
|---|---|---|---|
| 3,915,148 | 10/1975 | Fletcher et al. | 126/440 |
| 3,970,070 | 7/1976 | Meyer et al. | 126/440 |
| 4,022,186 | 5/1977 | Northrup | 126/438 |
| 4,103,673 | 8/1978 | Woodworth et al. | 126/440 |
| 4,108,540 | 8/1978 | Anderson et al. | 126/440 |
| 4,116,223 | 9/1978 | Vasilantone | 126/440 |
| 4,124,017 | 11/1978 | Paull | 126/440 |
| 4,136,670 | 1/1979 | Davis | 126/440 |
| 4,171,695 | 10/1979 | Sletten | 126/440 |
| 4,194,949 | 3/1980 | Stark | 126/440 |

Primary Examiner—Daniel J. O'Connor
Attorney, Agent, or Firm—William W. Haefliger

[57] ABSTRACT

A radiant energy redirecting system comprises:
(a) a radiant energy transmitting body means,
(b) said means comprising multiple elements, each of which acts as a radiant energy redirecting module, having on its cross-sectional perimeter an entry face to receive incidence of said energy into the interior of said perimeter, an exit face to pass said energy to the exterior of said perimeter in a direction towards the reverse side of the body from the side of said incidence, and a Totally Internally Reflecting face angled relative to said entry and exit faces to redirect towards said exit face the radiant energy incident from said entry face,
(c) said body means generally redirecting incident radiant energy towards a predetermined target zone situated apart from and on the reverse side of said body relative to the side of said incidence.

32 Claims, 21 Drawing Figures

RADIANT ENERGY CONCENTRATION BY OPTICAL TOTAL INTERNAL REFLECTION

This is continuation, of application Ser. No. 83,467 filed Oct. 10, 1979, now abandoned.

BACKGROUND OF THE INVENTION

This invention relates generally to radiant, particularly electromagnetic, energy concentration, redirection, and manipulation, and more particularly concerns apparatus and method for employing a transparent means with elements thereof using Total Internal Reflection (T.I.R.), alone or in conjunction with refraction; such elements acting in concert with purely refractive elements (as those in a Fresnel lens) and/or metal mirrors to redirect radiant energy to or from a predetermined zone or zones; such redirection having a predetermined degree of concentration and/or chromatic dispersion. The zones have sources of light, as in photoillumination, or radiant energy receiving means for conversion of the energy to thermal, electric, chemical, or mechanical forms. Alternatively, a further transparent means is employed, with elements thereof having the same design principle (T.I.R.) as above; said further transparent means acting as a secondary radiation redirector for the purpose of magnifying the degree of concentration and/or chromatic dispersion of the radiant energy redirected by the primary transparent means.

The prior art of radiant energy concentration in general consists of two major types, as exemplified by refractive and reflective astronomical telescopes: a refractive lens positioned in front of a receiver, or a retroreflective mirror positioned behind a receiver. The corresponding devices in the prior art of solar energy concentration are the Fresnel lens and the parabolic reflector, which focus solar energy on a target. Furthermore, there are non-focussing reflecting concentrators which have the advantage of fixed daily (non-tracking) position with only seasonal adjustments, but the disadvantage of requiring relatively large reflector areas and delivering only relatively low energy concentrations.

Fresnel lenses are devices using purely refractive elements. However, Fresnel lenses have physically inherent limitations of redirecting radiant energy, due to the low refractive indices of economically available materials, which give high f/ratios and bulky concentrator structure. Moreover, linear Fresnel lenses have, for off-angles in the direction of the grooves, focussing errors, which are also inherent in the laws of refraction, and which limit one-axis tracking configurations to relatively low concentration.

Parabolic reflector concentrators have been used, but are subject to losses of received radiant energy because the receiver is situated between the source and the reflector, which is thereby shaded, preventing in particular the utilization of large heat engines at the focus. Furthermore, the receiver is exposed to environmental degredation and thermal losses, and the inclusion of a protective transparent cover means about the receiver will merely reduce the system's efficiency.

Another reflecting system has appeared in the literature, as reported by Rabl in Solar Energy Vol. 19, No. 5. It employs a retro-reflecting means whose elements have two Totally Internally Reflecting faces, to redirect radiant energy out the same side as it came in. Its only improvement over a metal mirror of the same shape is a potentially higher reflectivity, but the double internal reflection doubles the sensitivity to manufacturing error over that of the present invention.

SUMMARY OF THE INVENTION

It is a major object of the present invention to overcome the above described problems of and difficulties with the prior art, and to provide a means to collect and employ radiant energy in a very cost-effective and efficient manner, using a new basic tool whose uses include the collection, concentration, redirection, and wavelength separation of radiant energy.

The present invention is basically characterized by the use of a transparent means employing elements to redirect radiant energy by means of Total Internal Reflection alone, or in conjunction with refraction, such means positioned between the radiant energy source and a receiver. Each element redirects radiant energy upon a common target zone or zones, during the energy's internal passage through the element. A properly oriented ray enters through the entry face and strikes the reflective face, which redirects it toward the exit face, the three faces comprising the active faces for that ray. Accordingly, the present invention is characterized by the passage of redirected radiant energy entirely through the transmitting body means and out the opposite side from which it entered, an entirely new concept constituting a third class of radiant energy concentrators, while also having applications to other forms of radiant energy redirection than concentration, such as wavelength separation or collimation. Other surfaces of the element may be inactive for the ray of interest (e.g., as in solar energy concentration of relatively parallel rays) but may impinge upon improperly oriented rays (e.g. diffuse skylight of off-angle sunlight).

The T.I.R. elements may be contiguous forming a transparent cover means, or separated to allow undeflected light to pass between them, for example to be focused by a mirror upon the back of the target, which is thereby illuminated from all directions.

Each element may redirect all of the parallel rays entering it into a single new direction, or split them into several directions, with or without wavelength separation, which can be controllably achieved by the independent non-normal angling of the entry face and/or the exit face to the parallel rays being redirected, or achieved by diffraction gratings upon the exit face. While Total Internal Reflection alone is limited to incident angles greater than Brewster's angle and therefore to redirective bend angles less than $180° - 2 \times$ Brewster's angle (about 96° for acrylic), additional redirection is possible with or without wavelength separation by the above-mentioned non-normal angling of the entry and exit faces. Such large bend angles enable a given diameter transparent means to be much closer to the target than a means limited to refraction alone, thereby greatly reducing the necessary support structure. Furthermore, a transparent means employing up to 90° bend angles can utilize a flat mirror extending from the target to the rim of the means.

Since a given acceptance angle (of deviation from parallelism) produces a proportional requirement for target size, the target can be bisected by the plane of said mirror, and result in an actual target of half the original size, with no decrease in acceptance angle, by insulating the half of the target facing away from the redirected body means. Conversely, the target can be doubled in size to give a doubled acceptance angle, and then halved by the mirror back to its original area. This surprising potential for halving thermal losses is unique to the present invention, being unavailable for the parabolic reflector of 90° rim angle because the plane mirror would shade the aperture, and also unavailable for the Fresnel lens because of its far lower rim angle. Unlike the Fresnel lens, chromatic aberration is completely independent of bend angle, and can have any positive, zero, or negative values desired for such wavelength-separation applications as solar illumination or bandgap-tailored photovoltaic cells. Unlike the parabolic reflector, the redirective bend angle of an element is independent of its location, greatly adding to design flexibility. (Since the parabolic reflector is a smooth continuum, there can be no arbitrary variations in redirective bend angle from one spot to a neighboring one.)

The superiority of the present invention can be seen in the application of direct heating of a fluid storage reservoir, as for domestic solar hot water, where the Fresnel lens fails due to an impractically large and expensive structure, and the present invention makes possible and slender and economical apparatus that is far more cost-effective than presently installed solar water-heating systems based on flat-plate collectors, with their elaborate and intricate systems of controls, pumps piping and collectors, so prone to high thermal losses and low efficiencies.

The advantages of the present invention imply greatly more cost effective solar energy devices than those of the prior art and combinations of the above advantages produce highly favorable results. For example, the abovementioned domestic solar water heating application will expectable cost much less than a flat-plate system, it can be installed quickly and easily anywhere in the world, and be capable of long life. This alone will greatly expand the capacity to switch to solar energy; but the present invention is just as applicable to much higher temperatures, to direct generation of electricity, and to practical solar illumination, bringing further advances over the prior art.

Different forms of this invention may be used in configurations that are fixed and non-tracking, or tracking in one or two axes, and with single or multiple redirective stages, and in conjunction with other devices such as thin films, or lasers. Applications include solar energy systems for photovoltaic, thermophotovoltaic, thermionic, thermoelectric, photothermal, photochemical, photoelectrochemical, photobiological, and photoillumination uses. This invention may also be used as a superior collimator for better singly or multiply beamed light sources capable of removing the beams invisible heat rays or of polarizing the beam. Finally, the unique configuration of the invention's multiple elements gives it an application in photography and in coherent optical information processing, by virtue of the 720°-annular paraxial point spread function of its two-dimensional axially-oriented embodiment, whereby multiple phase-encoded laser beams could all be simultaneously correlated in the area around the focal point.

DETAILED DESCRIPTION

Figure 1:
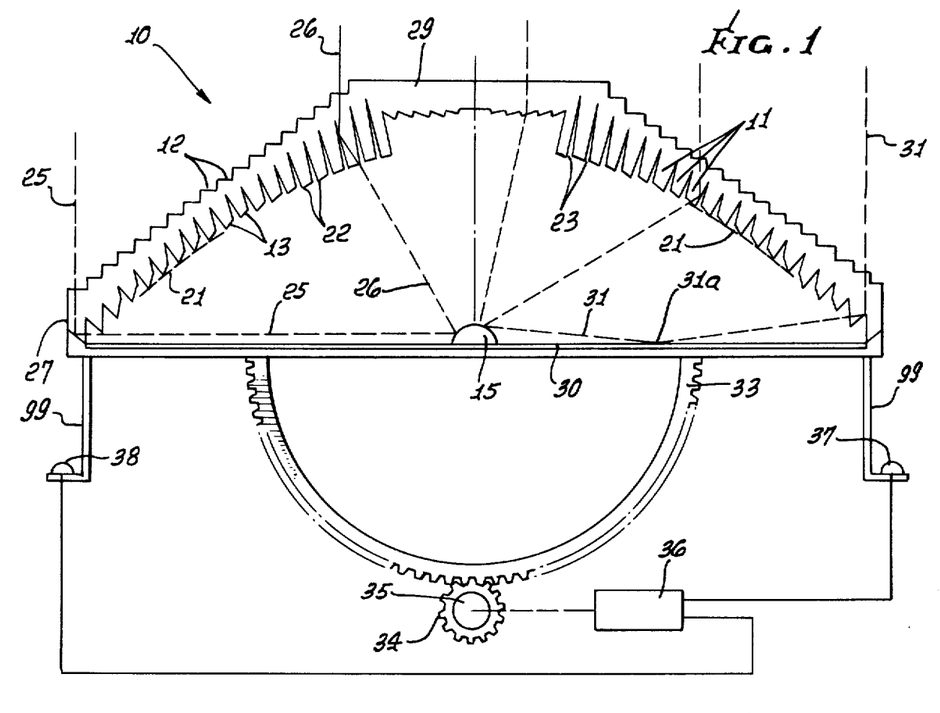
FIG. 1 is a vertical section in elevation showing one form of apparatus embodying the invention.

Referring first to FIG. 1, radiant energy transmitting body means 10 in the shape of a cover or dome has multiple facets or elements as at 11, each facet having an entry face to receive impingement of such radiation, an exit face to pass energy to the exterior of the body, and an internal reflection face angled relative to the entry and exit faces to reflect radiant energy incident on the reflection face toward the exit face. For example, in FIGS. 1 and 4d, a selected facet 11 has, in vertical cross section, an entry face 12 made up of stair-stepped faces 12a and 12b, an exit face 13 facing the zone of target 15, and an internal reflection face 14. Radiant energy such as light is represented by rays 16a and 16b entering the body means 10 at flat face 12a and normal thereto, and passing internally of the facet for reflection by face 14. For this purpose, the face may be silvered at 17. The reflected rays 16c then pass toward and through exit face 13, normal thereto, and directly toward the target zone.

The body means 10 may consist of solid transparent material such as glass or plastic, for example.

The multiple facets 11 shown in FIG. 1 may extend annularly about, and define a common axis 18, or they may extend in parallel relation (normal to the plane of FIG. 1) at opposite sides of a plane as alternatively represented by 18, and which is normal to the plane of FIG. 1. In either event, corresponding points on the facets define a concave surface, as for example at 21 (defined by the tips 22 of the facets closest the target), and characterized in that radiant energy passing through the exit faces is directed generally toward the target zone. Tips 22 are formed at the intersections of the faces 13 and 14. Surface 21 is parabolic.

The series of facets in FIG. 1 is further characterized by the existence of tapered gaps 23 between adjacent faces 24 and 14 of the projecting portions of the facets. Faces 24 are inactive surfaces, i.e. do not pass the radiation. See for example representative rays 25 and 26 in FIG. 1. Ray 25 is re-directed by its associated facet almost 90° toward the target, near the outer edge 27 of the "polymorphic lens" 10. Study of FIGS. 1 and 4 will show that angle α (the bend angle of the ray) increases for facets increasing in distance from axis or plane 18; and that angle β (the angularity of face 14 relative to a line or plane parallel to line or plane 18) increases for facets increasing in distance from 18. Also, the entry faces 12 form stair-step patterns.

FIG. 1 further shows a Fresnel lens 29 associated with polymorphic lens or body 10, and located at a mid-portion of the latter; thus Fresnel lens 29, which refracts incident radiant energy toward target 15, is located in the path of rays 30 which are re-directed the least, i.e. at the smallest angles, toward the target. Lens 29 may be integral with lens 10, for example.

Further, a reflector or mirror surface is shown at 30 spaced from and facing the facets at the target side thereof. Surface 30 is arranged to reflect stray or divergent radiation from the extreme outward facets toward the target. See ray 31 in this regard, and reflection point 31a. This allows target 15 to halve the area exposed to heat loss that it would have without surface 30, since the bottom non-illuminated half could be well insulated.

Also shown in FIG. 1 is one form of means to controllably tilt the assembly of lenses 10 and 29 and reflector 30 to cause axis 18 to remain directed toward a relatively moving source of radiation, as for example the sun. In that example, a base plate 32 supports reflector 30 as well as the dome-shaped lenses 10 and 29, via extreme outer edge portion 10a of the body means 10. A ring gear 33 supports plate 32, and meshes with spur gear 34. Drive motor 35 rotates gear 34 to controllably rotate ring gear 33, and a control unit 36 controls motor 35. Unit 36 is responsive to photocells 37 and 38 in such manner that the photocells remain directed toward the light source. The photocells are suitably carried at 99 by the plate 32, as for example near its periphery.

Target 15 may for example comprise a fluid receptacle which is heat conductive to transmit heat to fluid in the receptacle, as for example water in a pipe.

Figure 2:
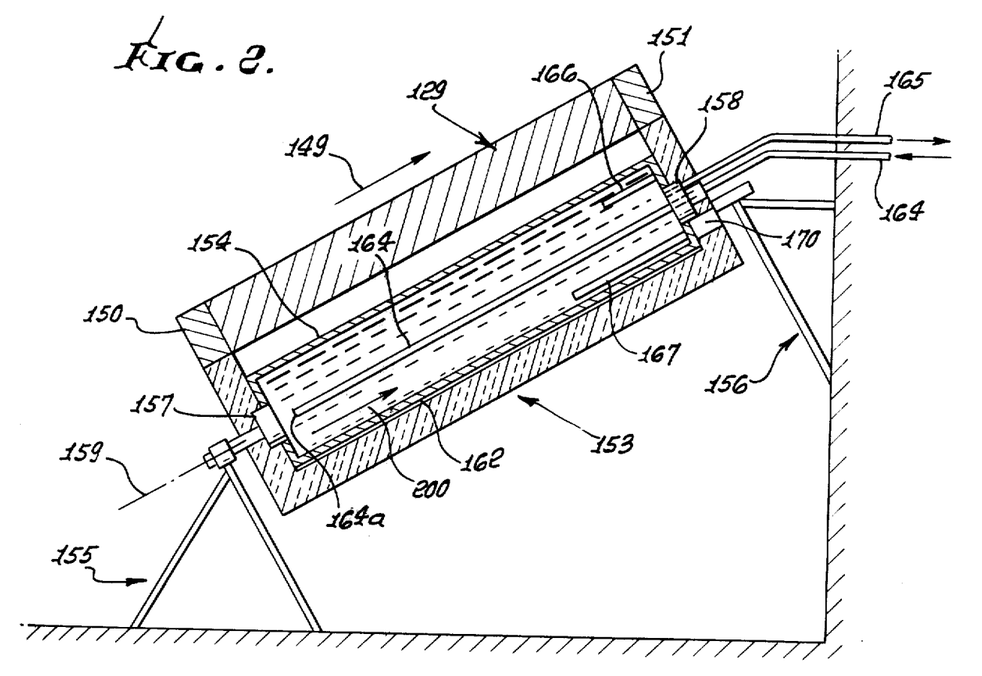
FIG. 2 is a vertical section in elevation showing another form of apparatus embodying the invention.
Figures 3, 4E, 7:
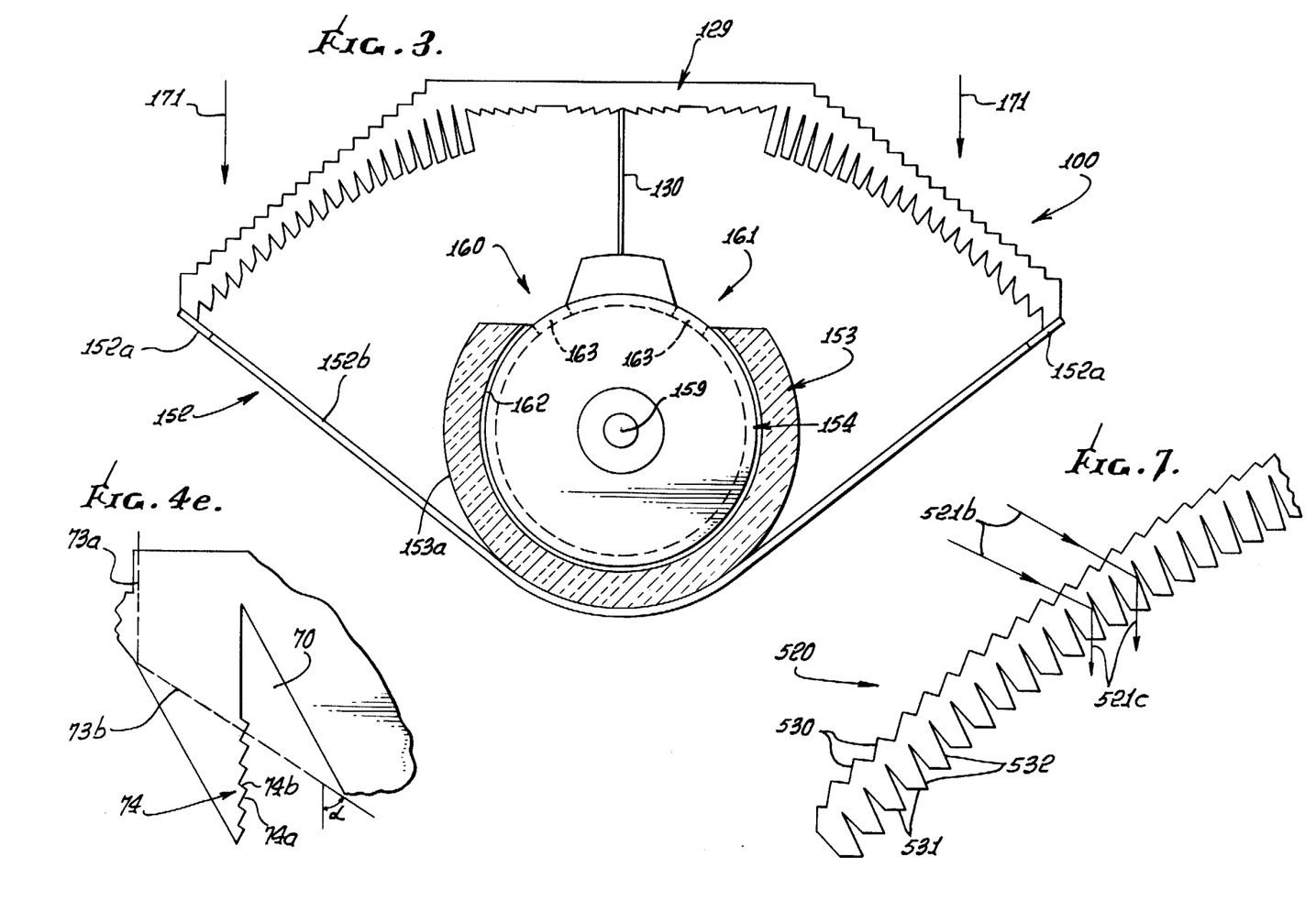
FIG. 3 is an enlarged section on lines 3—3 of FIG. 2.
FIGS. 4a through 4e are enlarged sections through elements of various configurations.
FIG. 7 is an enlarged section through a collimator as used in FIG. 6.

In FIGS. 2 and 3 the numerals 100 and 129 designate lenses corresponding to lenses 10 and 29 described above. They are elongated in the direction of arrow 149 and are carried by supports indicated at 150 and 151. V-shaped shroud 152 has edge portions 152a connected to the opposite edges of lens body 100, so that the shroud and lenses define an enclosure. A second and insulative tubular shroud 153 extends within that enclosure, about a tank 154 which has fixed (non rotatable) position. A support for the tank may take the form of legs indicated at 155 and 156, bearings being provided at 157 and 158 to allow tank and shroud rotation about central axis 159, along with the lens assembly. The shroud 153 is cut-away at locations 160 and 161 to allow entry of radiant energy from the lens assembly, to be absorbed by the tank, while heated air is prevented from escaping gap 162 by wipers 163; the enclosure has a reflecting interior surface 152b.

Cool liquid such as water enters the tank via pipe 164, is heated therein, and discharges into the tank lower end at 164a. Warmed liquid slowly flows at 200 backup the tank, being further heated by contact with the exterior of pipe 164, the liquid leaving the tank at outlet 165. A sacrificial anode 166 in the water 200 is adapted to corrode, electrolytically suppressing any corrosion of the tank itself. Also, a back-up heater 167 in water 200 is supplied with electrical current to heat water in the tank as when solar radiation is blocked or non-existent, as at night. An air-gap may be provided at 162 between shroud 153 and the tank itself. Sun tracking mechanism is indicated at 170, to rotate the assembly to maintain the sun's rays incident normally toward the lenses 100 and 129, i.e., in direction 171 in FIG. 3.

In operation, all radiation directed parallel to arrow 171 and striking the lenses 100 and 129 is redirected toward the tank, as facilitated by gaps 160 and 161, to heat the liquid in the tank. Also note windows 162 and 163. Wide angle, i.e., almost 180°, collection of the solar rays is employed, as described above in FIG. 1. The gap walls 153a are reflective, and may have other, curved, shapes besides the straight lines shown here, for the purpose of secondary concentration. Stray radiation from diffuse sources, such as skylight, is absorbed by blackening the surface 153a of shroud 153 and of lens support fin at 130.

Figures 4A, 4B:
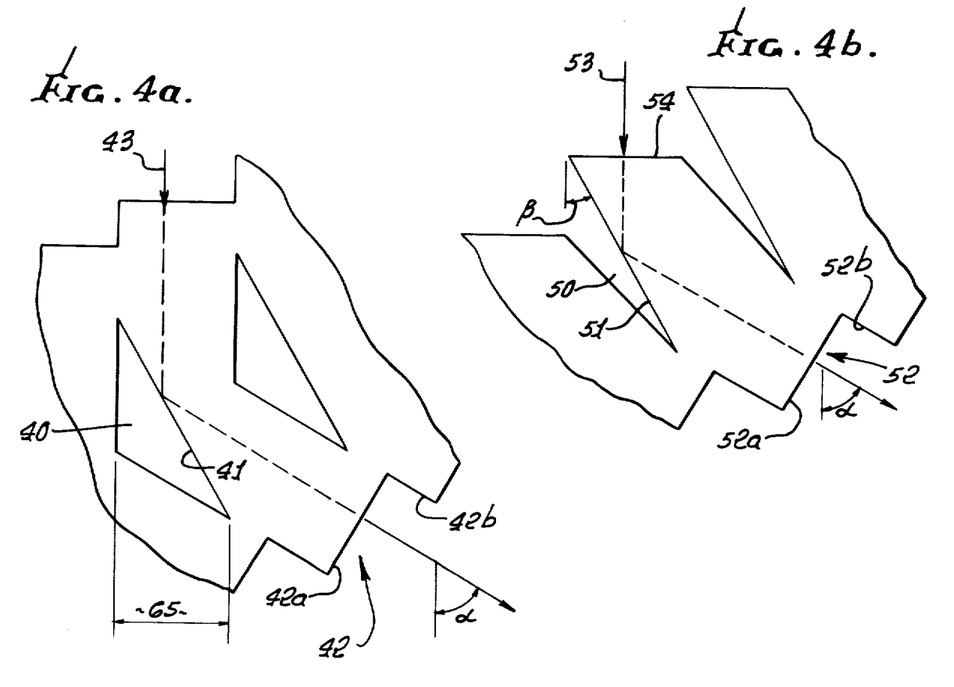
Figure 4C:
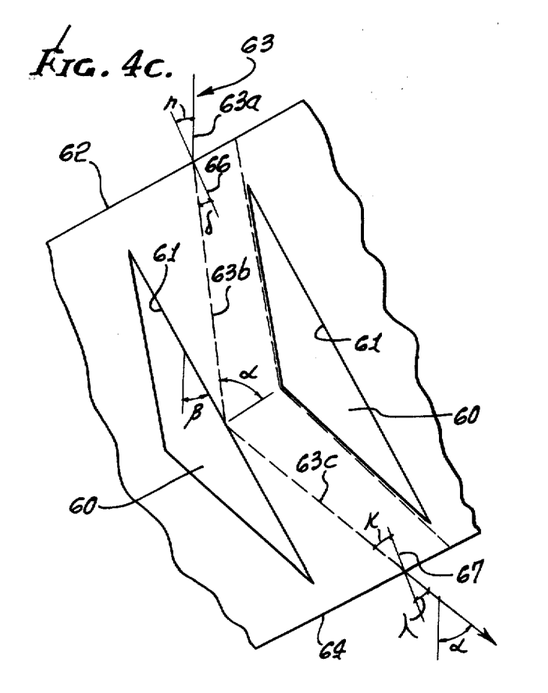
Figure 4D:
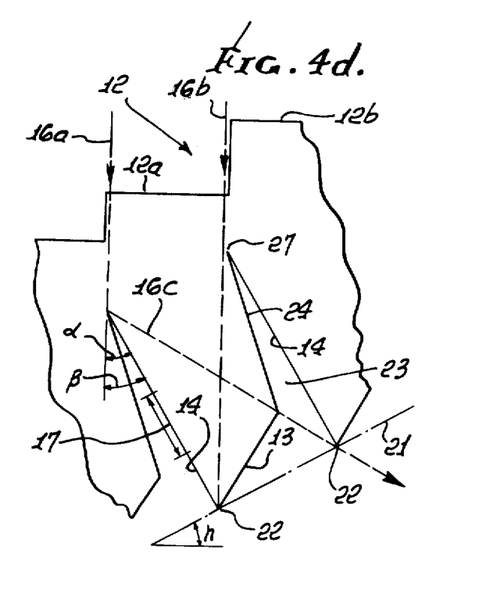

Various geometric configurations of elements and arrays of elements are possible, wherein various element configuration have the same relative angles of the three active faces, but differing deployments within the transparent means; e.g., the T.I.R. face can be in faceted slots on either side of the body means or on the walls of tunnels within the latter, while the entry faces can be on faceted steps or even on a completely smooth cover surface. In FIG. 4a, tunnel 40 forms T.I.R. face 41, while exit face 42 has stairsteps 42a and 42b. In FIG. 4b, slot 50 is on the entry side of the body means, having T.I.R. face 51 and entry face 54. Exit face 52 has stairsteps 52a and 52b. In FIG. 4c, tunnel 60 forms T.I.R. face 61, and entry face 62 and exit face 64 are on smooth continuous surfaces. However, T.I.R. face 61 must be longer than T.I.R. faces 41 of FIG. 4a or 51 of FIG. 4b, because of the refractive bending of ray 63 by entry face 62. In general, the length of a T.I.R. face relative to facet width 65 is:

T.I.R. LENGTH = cos δ/(cos η cos η)

where η is the incident angle of ray 63a with surface normal 66, δ is the angle of the refracted ray 63b with 66, κ the incident angle of reflected ray 63c with exit surface normal 67, and λ the angle of refracted ray 63d with 67. The relationships of these angles are given by Snell's law:

sin η = n sin δ, and sin λ = n sin κ where n is the index of refraction of the body means material. For contiguous elements to redirect to a target all the parallel rays incident upon them, neighboring elements must be relatively positioned everywhere on or above a parabola with the target as its focus and a rim slope equal to half the rim angle (i.e. the redirective bend angle of the outermost elements). In FIG. 4d, "extreme" ray 16c must clear tip 22 of the inward adjacent facet, while the other extreme ray, 16b, must clear top 27 of slot 23. These clearance conditions require that the lens slope angle η be greater than or equal to the T.I.R. tilt angle, which is geometrically equivalent to tangent line 22 being on or above said parabola. Note that all of the configurations of FIG. 4 have the same bend angle α, and except for FIG. 4c, the same normal entry and exit faces. See for example the elements 311 of the "cover" 310 in FIG. 5, above the parabola 321 tangent to the tips 322. See also line 324. Those tips below the parabola, such as for a quarter-circle 325 with the same slope at the rim, would in this stairstep configuration suffer some interelement impingement, about 10% for both cylinders and spheres, but the use of a thin flexible inflateable dome for a transparent cover means might be worth such a loss, especially since the untargeted rays would still be redirected to a locus within the cover means, to assist the pressurization by heating the enclosed air. See FIG. 11 for a non-impinging circular configuration. An alternative facet style seeks to minimize such impingement losses by concentrating the rays before they strike the T.I.R. face, which can thereby be smaller to reduce said impingement. Convex and concave entry and exit faces will do this, though with some decrement of the cover's concentration ratio or acceptance angle, which for some applications is far outweighed by bringing the transparent redirecting means even closer to the target.

Figure 5:
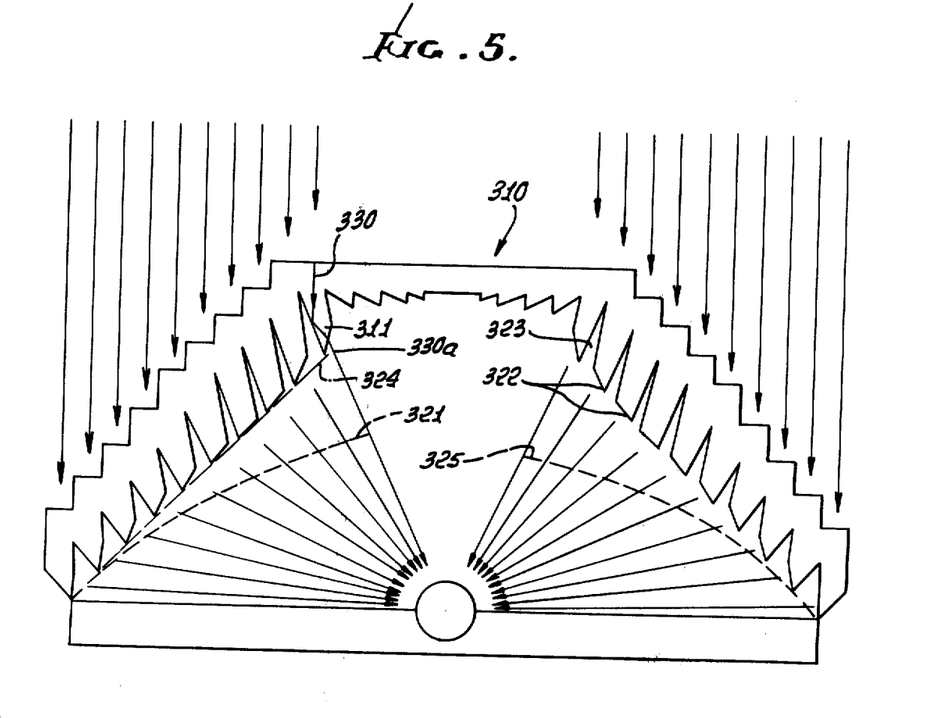
FIG. 5 is a view like FIG. 1 showing a portion of a polymorphic optical concentrator of somewhat different, and employed configuration.

For the smaller bend angles, the present invention begins to have difficulties, in the narrowness required of the tunnels or slots 23 in FIG. 4d forming the T.I.R. faces of the low bend-angle elements. This can be somewhat alleviated by raising the profile of the transparent means 310 above the parabola 321 to widen the slots and tunnels beyond their minimum widths. Another form of such an alleviation is a backbending exit face, 311 of FIG. 5, so angled that its refractive redirection opposes the redirection of the T.I.R. face, which can thereby have a greater redirective bend angle with a less steep slope, giving wider tunnels or slots. In FIG. 5, note that ray 330 strikes the exit face 311 non-normally, so that ray 330a is bent back toward the target. This enables a wider slot 323 than if the exit face was normal and the T.I.R. face was at a steeper angle. The above mentioned convex entry face will also widen the slots or tunnels. Another method of widening the slots is the faceted exit face, shown in FIG. 4e. Here slot 70 has been opened until it nearly impinges upon extreme ray 73b. Exit face 74 has miniature stairsteps 74a and 74b, respectively normal to and parallel to reflected ray 73b. Alternatively, a thin microstructured series of elements of high refractive index (say n=4) can be embedded in the body means to form more favorably shaped elements. The particular manufacturing method and design application will determine the place of transition to a Fresnel lens, or alternatively to a window that passes rays to a small parabolic reflector behind the target, which is thereby illuminated from a full circle of directions. Another possible configuration would have the outer parts of the redirecting means sending radiant energy to a central target while the inner parts redirected energy to outer targets, using only large bend angles throughout. All these configurations are derivatives of the basic method of this invention: upon multiple Totally Internally Reflecting transmitting elements, properly placed entry, exit, and T.I.R. faces redirect radiant energy to a predetermined target zone.

It should also be said that the present invention employs a cover means (as at 10 or 110) whose focal length can be shorter than any parabolic mirror with concentrations twice as high, but which is free from shading and presents a convex surface with lower aerodynamic drag than the concave parabolic mirror. Its target is nearer the center of gravity and closer to the ground than that of the parabolic reflector, making fixed receiver means easier to design and maintain. Finally, the nearly 100% reflective efficiency of the Total Internally Reflecting faces of the present invention give much greater potential for high efficiencies than does the parabolic mirror.

In FIGS. 1 and 5, it will be understood that the elements 11 and 311 join together, integrally and continuously, to form a radiant energy transmitting means in the general form of a cover. The latter has an energy entry surface (top surface in FIG. 1, for example) and an exit surface (bottom surface in FIG. 1) lying on opposite sides of the cover. The cover causes radiant energy leaving the exit surface to have a generally different direction than the direction of energy incidence on the entry surface. Also, multiple T.I.R. faces are situated on the exit surface adjacent slots proximate the exit surface, as referred to above. The entry surface has a faceted stairstep configuration. The exit surface of the cover lies beyond and further from the target than a parabola (see 21 and 321). The cover may be constructed of transparent material, as for example plastic.

Figure 8:
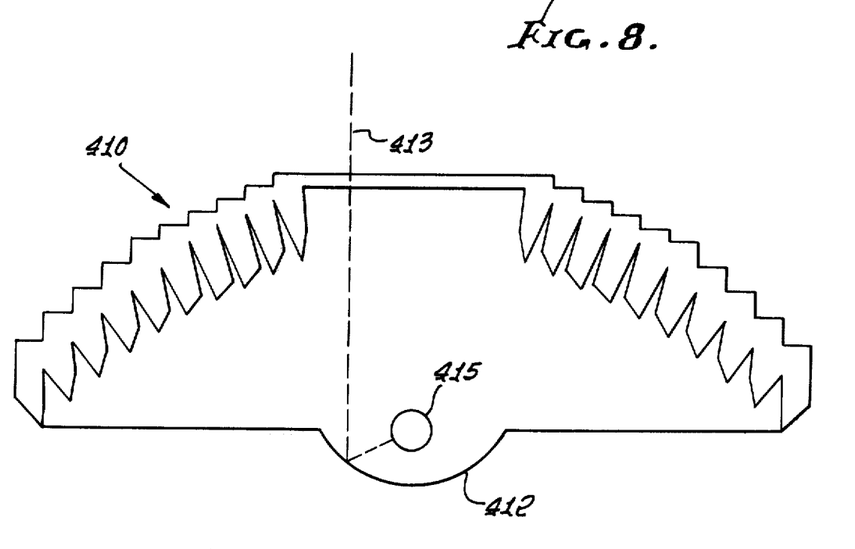
FIGS. 8–11, 13, 14 and 15 are schematics showing different applications of the radiant energy concentrating means.

FIG. 8 schematically shows a means 410 corresponding to the means 10 of FIG. 1 or 310 of FIG. 5, or equivalent. A target zone is shown at 415. A retroreflector means 412 is spaced behind and facing the target zone so as to redirect radiant energy upon the target zone. See ray 413.

Figure 9:
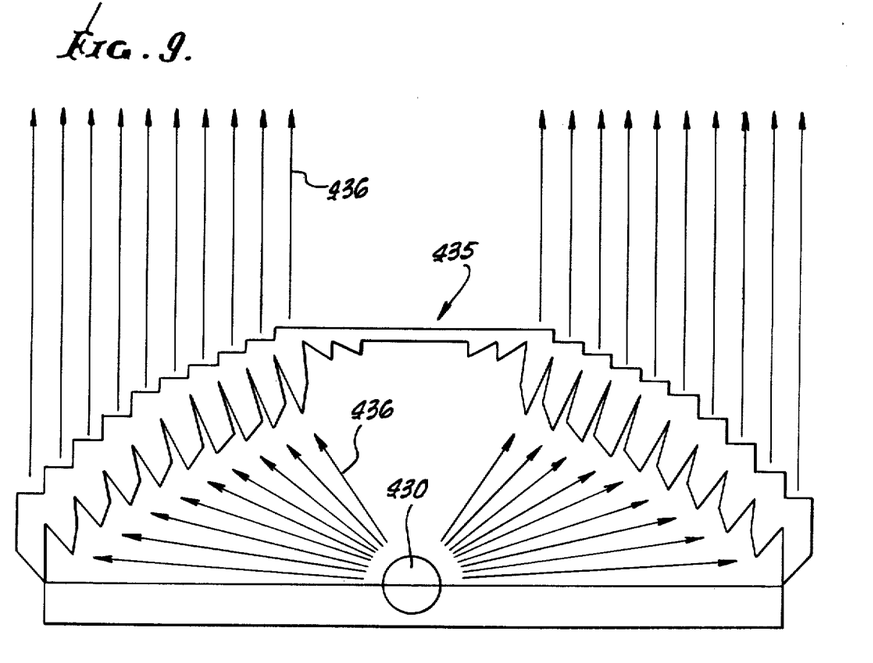

FIG. 9 schematically shows a radiant energy source means (as for example a light source) at 430, at the target zone. Radiant energy emitted by the source means 430 is redirected by the body means 435 (like 10 or 310) in reverse relation. See ray 436.

Figure 10A:
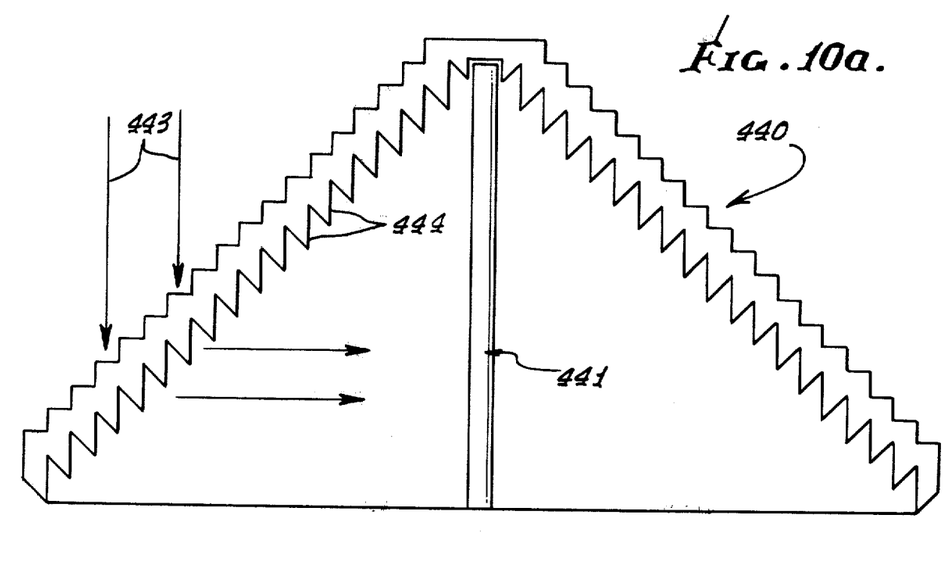
Figure 10B:
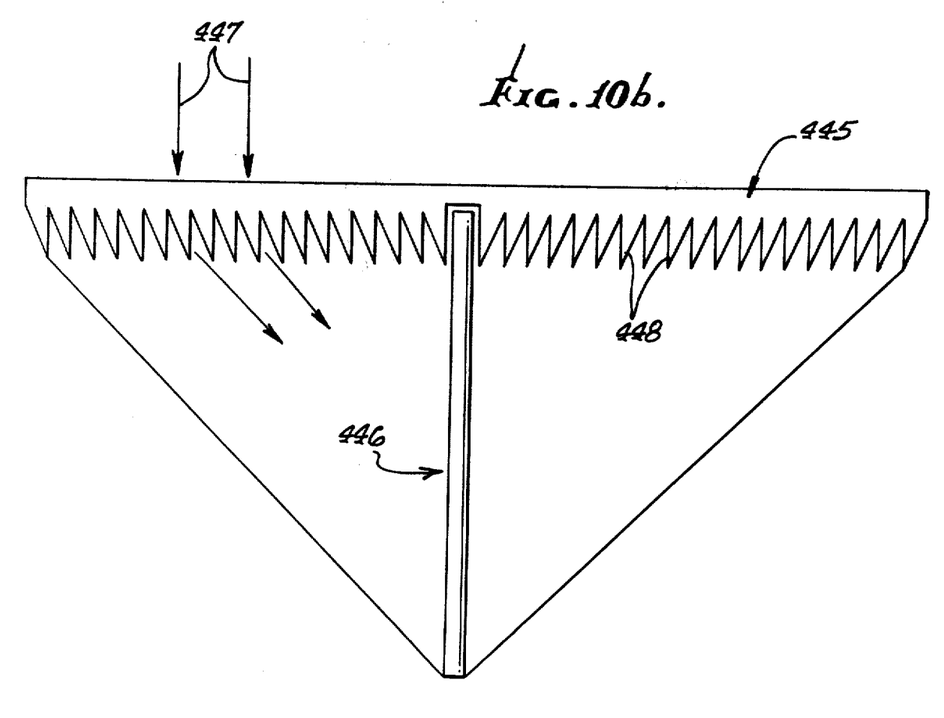

FIGS. 10a and 10b show two variations of a "unibend" lens with uniform facets extending annularly about a cylindrical target. In FIG. 10a, all the facets 444 of conical body means 440 bend rays 443 through 90 degrees onto cylindrical target 441. In FIG. 10b, flat body means 445 has identical facets 448 bending rays 447 through 45 degrees upon cylindrical target 446.

Figures 11, 12A, 12B, 13:
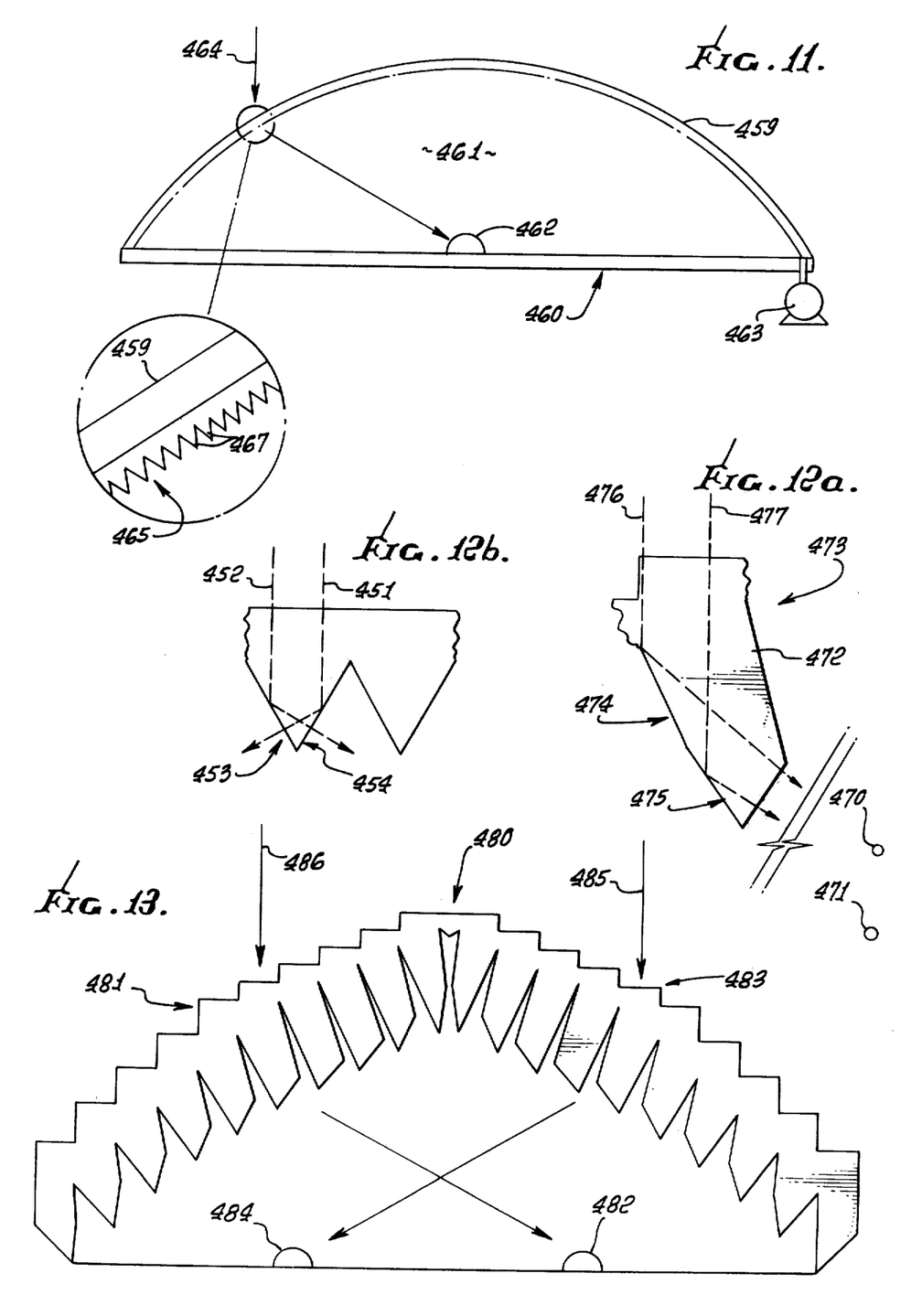
FIG. 12a and 12b are fragmentary sections showing modified concentrators.

FIG. 11 shows a structural means 460 enclosing the space 461 behind the exit face of the cover means 459 (like 10 or 310), so that pressurization of the atmosphere of space 461 will hold the flexible cover means in its distended or circular shape, with center of curvature at point 426. See target zone 462, pressurization means such as a pump 463, and ray 464. A thin film 465 adheres to the inside of cover means 459, having miniature sawtooth facets 467 as shown in the insert.

FIG. 12a shows a plurality (two for example) of target zones 470 and 471 to receive radiant energy from the transmitting body means 472 (like 10 or 310). Each element 473 redirects energy in a plurality of directions, toward the target zones. Thus, each element 473 may be like element 10 or 310 described above, but have a T.I.R. face divided into two sub-faces 474 and 475 at slightly different angles to accomplish the reflection of the two rays 476 and 477 respectively directed by the faces 474 and 475 toward the two target zones. In FIG. 12b, T.I.R. face 453 is the exit face for ray 451, while T.I.R. face 454 is the exit face for ray 452. This symmetrical case of twin 60 degree bends may be varied to give two different right and left hand bends, with differing division of the incoming radiant energy. In FIG. 13 the cover means 480 (like 10 or 310) has different groups of elements redirecting radiant energy toward different target zones. Thus, the elements at locus 481 direct radiant energy toward target 482, and the elements at locus 483 direct energy toward target 484. See rays 485 and 486.

Figure 6:
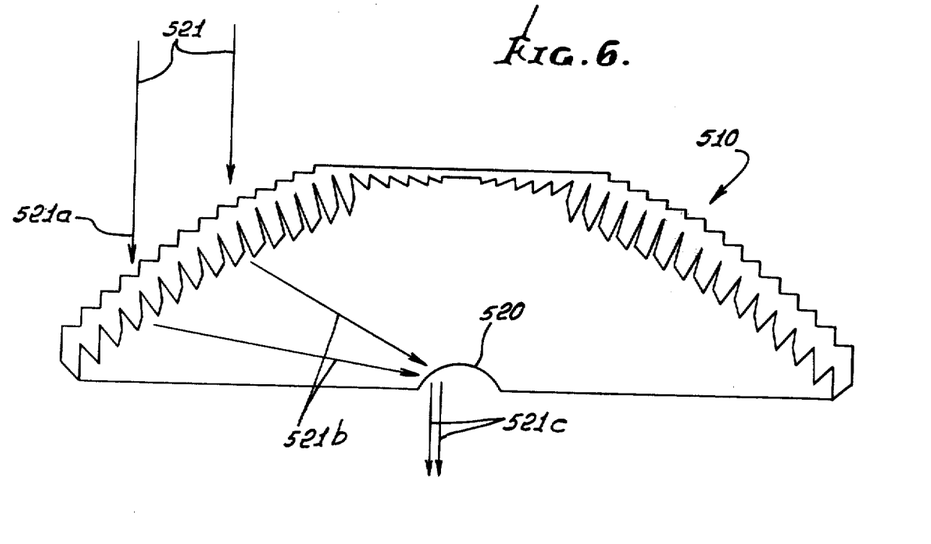
FIG. 6 is a schematic showing two devices, operating in conjunction, one of which is like that of FIG. 1 or 5, and the other being a collimator.

In FIG. 6, cover or body means 510 corresponds to 10 or 310 described above. A secondary radiant energy redirecting means is provided at 520 to intercept the radiant energy from body 510, and to redirect it. See rays 521 with segments 521a falling on body 510; redirected segments 521b falling on body 520; and secondarily redirected segments 521c transmitted by body 520. FIG. 7 shows body 520 in detail, with entry faces 530, exit faces 531, and T.I.R. faces 532. The rays 521c are parallel, in this instance, i.e. collimated, so that means 520 may be regarded as a collimator.

Figure 14:
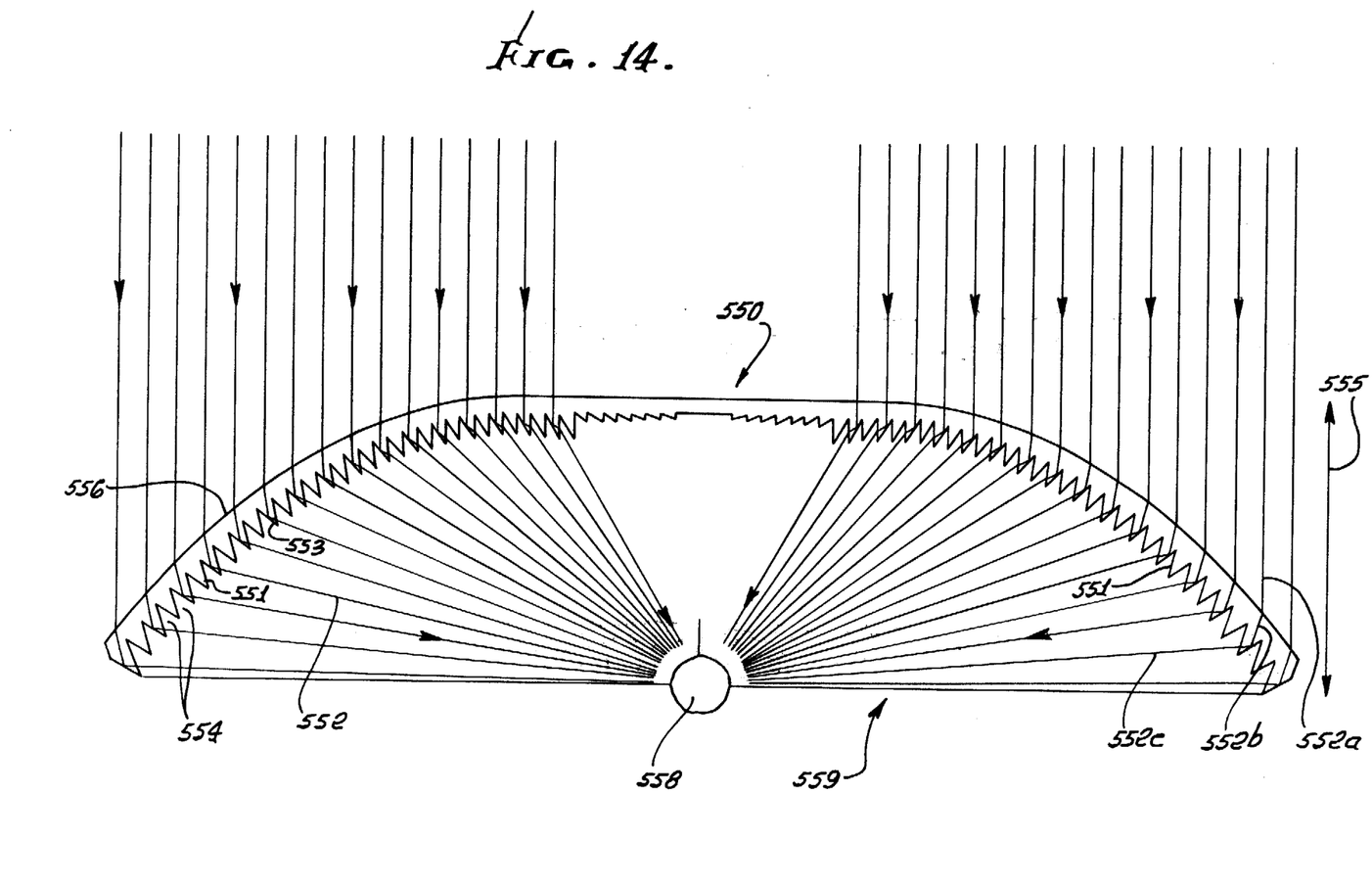

The means 550 shown in FIG. 14 is like 10 and 300, except that the exit faces 551 are individually angled relative to radiant energy passing through them, so as to cause refractive redirection of the radiant energy. See beam 552 refracted at face 551. Also in FIG. 14, the exit faces 551 may be considered to refractively redirect radiant energy in partial opposition to the redirection by the T.I.R. faces 553, the latter extending at less steep angles (than in FIGS. 1 and 5) so as to widen the slots 554. Note also in FIG. 14 that the entry face is smooth and unfaceted, at 556, and that exit face 551 is parallel to refracted ray 552b, giving the maximum backbend and the lowest possible slope of entry surface 556, which in fact is lower than the parabola 321 or the quarter-circle 325 in FIG. 5.

Figure 15:
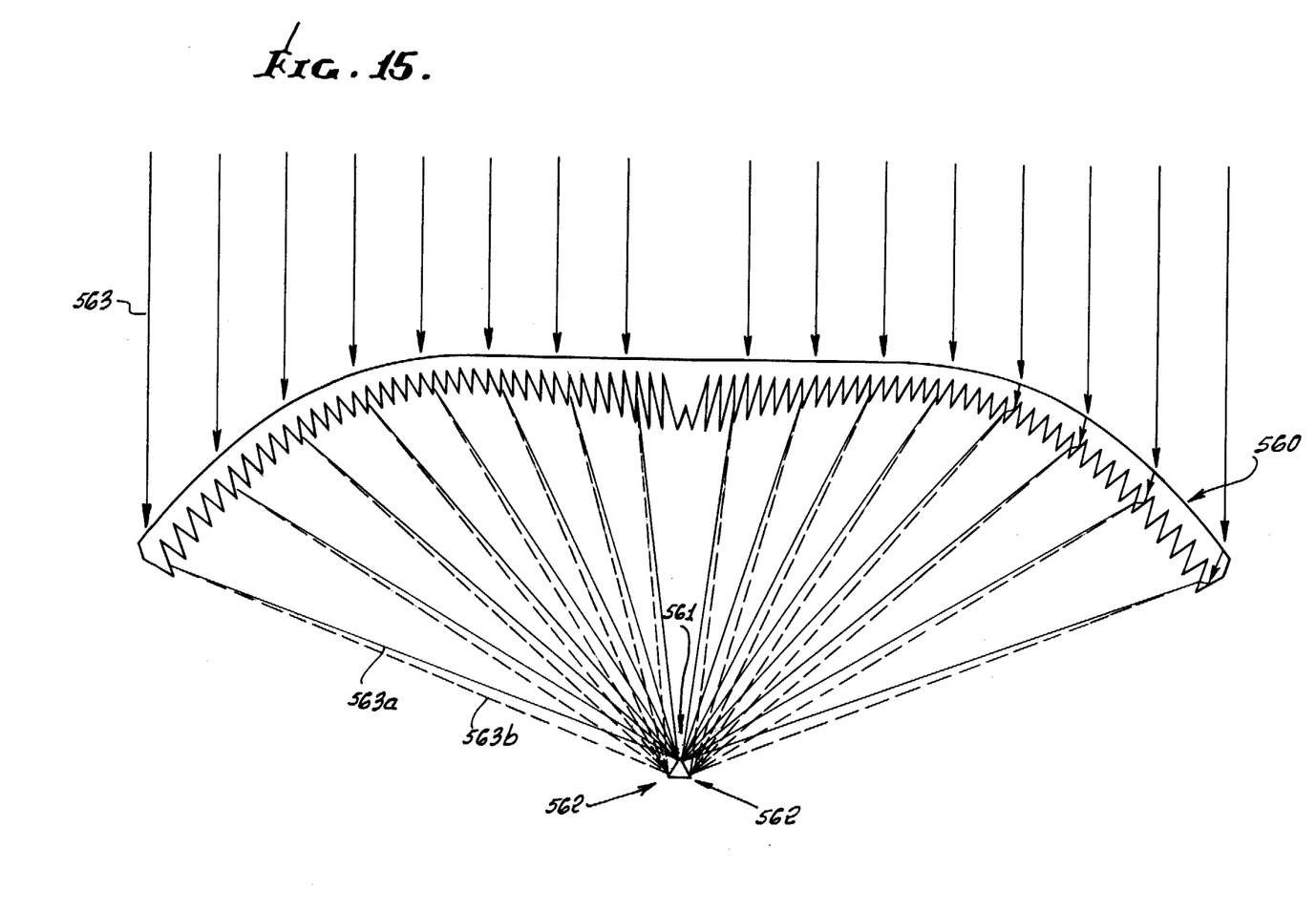

In FIG. 15 the body means 560 is like that at 10 or 310, except that it utilizes the variation index of refraction that varies with the wavelength of the radiant energy, so as to constitute a wavelength separating, radiant energy redirecting, transmitting body means. Two target zones 561 and 562 are shown, and are spaced apart to receive different wavelengths of the wavelength separated, redirected, radiant energy. See incident ray 563 which separates into ray 563a of one wavelength directed toward target 561, and ray 563b of another wavelength directed toward target 562.

In FIG. 15, either target may be considered as a means to convert radiant energy to electricity. One such means is a photovoltaic cell. Such a device may be located at the target zones in FIGS. 1 and 5. In FIG. 15, one target may comprise a photoillumination means receiving visible wavelengths; and the other target may comprise a thermal receiver receiving invisible wavelengths, at zone 561.

When a source of radiant energy is placed in zone 562, the visible wavelength rays will follow the reverse path of rays 563 i.e., be collimated, while the invisible longer-wavelength heat rays will be diverged more outwards from the visible beam, so that spotlights on actors will not subject them to a heat load several times greater than that of the visible radiation.

We claim:

1. A radiant energy redirecting system comprising
   (a) a radiant energy transmitting body means,
   (b) said means comprising multiple elements, each of which acts as a radiant energy redirecting module, having on its cross-sectional perimeter an entry face to receive incidence of said energy into the interior of said perimeter, an exit face to pass said energy to the exterior of said perimeter in a direction towards the reverse side of the body from the side of said incidence, and a Totally Internally Reflecting face angled relative to said entry and exit faces to redirect towards said exit face the radiant energy incident from said entry face,
   (c) said body means generally redirecting incident radiant energy for travel towards a predetermined target zone situated apart from and on the reverse side of said body relative to the side of said incidence, said entry faces defining a first set and said exit faces defining a second set, the faces of one of the sets being variably angled relative to one another, and with angularity that progressively increases for successive elements, relative to the target zone,
   (d) the elements forming tapered gaps therebetween, said gaps having apices, the body being continuous and uninterrupted everywhere along straightlines joining successive of said apices, in planes normal to said faces.

2. The system of claim 1 wherein the Totally Internally Reflecting face is a body boundary, so that the index of refraction "n" of the substance of said transparent body means at said boundary gives total internal reflection of all radiant energy whose incident angle with the normal of said boundary at the point of incidence exceeds Brewster's angle, which equals the inverse sine of the reciprocal of "n".

3. The system of claim 1 wherein said perimeters of said elements project from said cross-section to extend linearly, in parallel relation, said entry faces facing said incident radiant energy, said exit faces facing said target zone.

4. The system of claim 1 wherein said perimeters of said elements project from said cross-section to extend annularly about, and define, a common axis, said entry faces facing said incident radiant energy, said exit faces facing said target zone.

5. The system of claim 1 including a Fresnel lens associated with said body means located in a midportion of said body means so as to redirect radiant energy through relatively small angles toward the target zone.

6. The system of claim 1 including a retroreflecting means spaced behind and facing said target zone so as to redirect radiant energy upon said target zone.

7. The system of claim 1 including a radiant energy source means situated in said target zone, and radiant energy emitted by said source means being redirected by said body means in reverse relation to the transmission by the body means in claim 1.

8. The system of claim 1 including a radiant energy redirecting means situated at said target zone.

9. The system of claim 1 including a radiant energy absorbing fluid receptacle at said target zone.

10. The system of claim 9 including means to convey relatively cool fluid into said receptacle and relatively hot fluid out of said receptacle.

11. The system of claim 9 including thermally insulating means about said receptacle, said means having a radiation entrance situated about said target zone so that redirected radiant energy is absorbed by said receptacle.

12. The system of claim 1 wherein said elements join contiguously to form a radiant energy transmitting cover means with an entry surface and an exit surface lying on opposed sides of said cover means, which cover means causes radiant energy leaving the exit surface to have a generally different direction than it did at incidence upon said entry surface.

13. The system of claim 12 wherein multiple Totally Internally Reflecting faces are situated on facets defined by said entry surface.

14. The system of claim 12 wherein the Totally Internally Reflecting faces are situated on walls adjacent voids extending within the interior of said radiant energy transmitting body means.

15. The system of claim 12 wherein the entry surface has a faceted stairstep configuration.

16. The system of claim 12 wherein said exit surface of said cover means lies beyond and further from the target than said parabola.

17. The system of claim 12 wherein
   (a) said cover means forms a circular shape,
   (b) and including structural means enclosing the space behind the exit surface, so that pressurization of the atmosphere of said enclosed space will help hold said cover means in said circular shape.

18. The system of claim 1 wherein there is a plurality of target zones to receive redirected radiant energy from said transmitting body means.

19. The system of claim 18 wherein each element redirects radiant energy in a plurality of directions, towards said target zones.

20. The system of claim 18 wherein different groups of elements redirect radiant energy towards different target zones.

21. The system of claim 18 wherein secondary radiant energy redirecting means are provided to intercept said redirected radiant energy from said transmitting body means.

22. The system of claim 1 wherein the entry and/or exit faces are individually angled relative to the radiant energy passing through them so as to cause refractive redirection of said radiant energy.

23. The system of claim 1 including means to controllably tilt said body to cause said entry faces to remain properly inclined relative to an angularly moving source of radiant energy, such as the sun.

24. The system of claim 1 wherein said entry faces together form a smooth dome.

25. A radiant energy redirecting system comprising (a) a radiant energy transmitting body means, (b) said means comprising multiple elements, each of which acts as a radiant energy redirecting module, having on its cross-sectional perimeter an entry face to receive incidence of said energy into the interior of said perimeter, an exit face to pass said energy to the exterior of said perimeter in a direction towards the reverse side of the body from the side of said incidence, and a Totally Internally Reflecting face angled relative to said entry and exit faces to redirect towards said exit face the radiant energy incident from said entry face, (c) said body means generally redirecting incident radiant energy for travel towards a predetermined target zone situated apart from and on the reverse side of said body relative to the side of said incidence, said entry faces defining a first set and said exit faces defining a second set, the faces of one of the sets being variably angled relative to one another, (d) said elements joining contiguously to form a radiant energy transmitting cover means with an entry surface and an exit surface lying on opposed sides of said cover means, which cover means causes radiant energy leaving the exit surface to have a generally different direction than it did at incidence upon said entry surface, (e) said entry surface being smooth and unfaceted, containing thereupon said individually angled entry faces, so relatively positioned as to smoothly be a part of said entry surface.

26. The system of claim 25 wherein multiple Totally Internally Reflecting faces are situated adjacent slots proximate said exit surface.

27. The system of combination of claim 26 wherein said exit faces refractively redirect radiant energy in partial opposition to the redirection by the Total Internally Reflecting faces which lie at a less steep relative angle so as to widen said slots in said faceted exit surface.

28. The system of claim 25 wherein the outer edges of said exit surface lie on a parabola whose geometric focus is in the target zone.

29. The system of claim 25 wherein the radiant energy transmitting body means has an index of refraction varying with the wavelength of said radiant energy, so as to constitute a wavelength separating radiant energy redirecting transmitting body means.

30. The system of claim 29 wherein the target zones are spaced apart to receive different wavelengths of the wavelength-separated redirected radiant energy.

31. The system of claim 30, wherein means for converting radiant energy directly to electricity are situated in the target zone.

32. The system of claim 30 wherein visible wavelengths are redirected toward a radiant-energy receiving photoillumination means at one target zone and the invisible wavelengths are redirected toward a thermal receiver at another target zone.

* * * * *